United States Patent [19]

Cossey

[11] Patent Number: 4,702,572
[45] Date of Patent: Oct. 27, 1987

[54] SYSTEM FOR VIEWING AN INFANT IN THE REAR SEAT OF A VEHICLE

[76] Inventor: Jackie J. Cossey, 4245 Judson, Houston, Tex. 77005

[21] Appl. No.: 799,799

[22] Filed: Nov. 20, 1985

[51] Int. Cl.⁴ .......................... B60R 1/00; B60R 1/04; B60R 1/08; G02B 7/18
[52] U.S. Cl. .................................. 350/639; 350/632; 350/623; 350/618; 248/480; 248/481
[58] Field of Search ............... 350/632, 631, 639, 623, 350/618, 612, 604; 248/475.1–483

[56] References Cited

U.S. PATENT DOCUMENTS

| | | | |
|---|---|---|---|
| 167,585 | 9/1875 | Stephenson | 350/631 |
| 392,466 | 11/1888 | Shurtleff | 248/479 |
| 582,724 | 5/1897 | Dromgoole | 248/475.1 |
| 763,380 | 6/1904 | Martin . | |
| 842,313 | 1/1907 | Harrison . | |
| 1,629,458 | 5/1927 | Jassen | 248/475.1 |
| 1,986,033 | 1/1935 | Trufant . | |
| 2,051,406 | 8/1936 | Green | 248/477 |
| 2,374,956 | 5/1945 | Rubissow . | |
| 3,072,017 | 1/1963 | Levy . | |
| 3,118,965 | 1/1964 | Jones | 248/481 |
| 4,163,606 | 8/1979 | Granno . | |
| 4,359,266 | 11/1982 | Rohlf et al. | 350/639 |
| 4,549,790 | 10/1985 | Harris | 350/624 |

FOREIGN PATENT DOCUMENTS

| | | | |
|---|---|---|---|
| 2838525 | 3/1980 | Fed. Rep. of Germany | 350/626 |
| 164748 | 3/1922 | United Kingdom | 248/480 |
| 298357 | 10/1928 | United Kingdom | 248/481 |

Primary Examiner—Jon W. Henry
Attorney, Agent, or Firm—Warren B. Kice

[57] ABSTRACT

A system for viewing an infant in the rear seat of the vehicle utilizing a mirror mounted in the back seat of the vehicle which is adjustable so that it reflects the image of the infant to the rear view mirror for viewing by the driver of the vehicle.

7 Claims, 2 Drawing Figures

SYSTEM FOR VIEWING AN INFANT IN THE REAR SEAT OF A VEHICLE

BACKGROUND OF THE INVENTION

This invention relates to a system for viewing an infant in the rear seat of a vehicle and, more particularly, to such a system employing an additional mirror in the back seat of the vehicle.

When traveling in a vehicle such as an automobile, a two seated truck, a van or the like, it is often preferable to place an infant in the back seat of the vehicle, due to the presence of another passenger or due to safety considerations, or the like.

However, problems are encountered when the infant is placed in the rear seat of the vehicle since it is often difficult, if not impossible, to view the infant properly and still enable the driver of the vehicle to maintain proper eye contact with the road.

These problems of viewing the infant are compounded by the fact that recent legislation requires that infants be placed in the rear seat of a vehicle in a specially designed infant seat which is constructed and arranged so that the infant is facing the rear of the vehicle for safety purposes.

SUMMARY OF THE INVENTION

It is therefore an object of the present invention to provide a system for viewing an infant in the rear seat of a vehicle which enables the driver of the vehicle to maintain proper eye contact with the road.

It is a further object of the present invention to provide a system of the above type in which a driver utilizes his standard vehicle rear view mirror to view the infant in the back seat.

It is a still further object of the present invention to use a reflector, such as a second mirror, disposed in the back seat to reflect the image of the infant to the rear view mirror of the vehicle for viewing by the driver of the vehicle.

Toward the fulfillment of these and other objects, the system of the present invention is designed for viewing an infant in the rear seat of the vehicle and utilizes a mirror mounted in the back seat of the vehicle which is adjustable so that it reflects the image of the infant to the rear view mirror for viewing by the driver of the vehicle.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention when taken in conjunction with the accompanying drawings wherein.

DESCRIPTION OF THE PREFERRED EMBODIMENT

Figure 1:
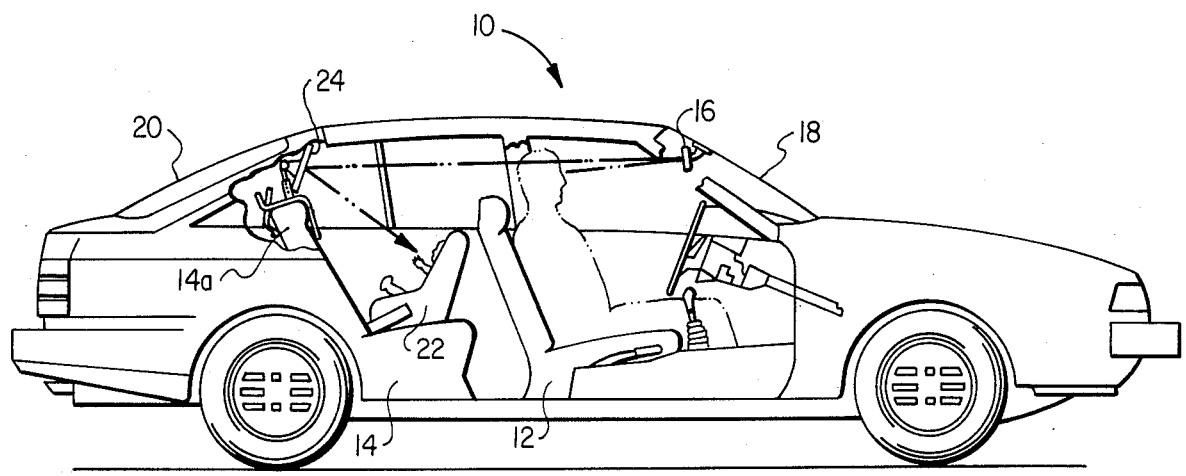
FIG. 1 is a side elevational view, partly cut away, of a vehicle incorporating the system of the present invention

Referring specifically to FIG. 1 of the drawings, the reference numeral 10 refers in general to a vehicle having a front seat 12 and a rear seat 14. A standard rear view mirror 16 is mounted on the inner surface of the front window 18 and is designed to reflect images from the rear of the vehicle which pass through the rear window 20 during normal driving conditions.

The system of the present invention is designed to enable the driver to view, through the rear view mirror 16, an object, such as an infant, disposed in the rear seat 14. For the purpose of example, it will be assumed that an infant is disposed in a baby seat 22 placed on the seat portion of the rear seat in a direction facing the rear of the vehicle, as shown.

To this end, a reflecting member, such as a mirror 24, is mounted to the back support portion 14a of the rear seat 14, and is designed to reflect the image of the infant in the baby seat 22 to the rear view mirror 16 for direct viewing by the driver.

Figure 2:
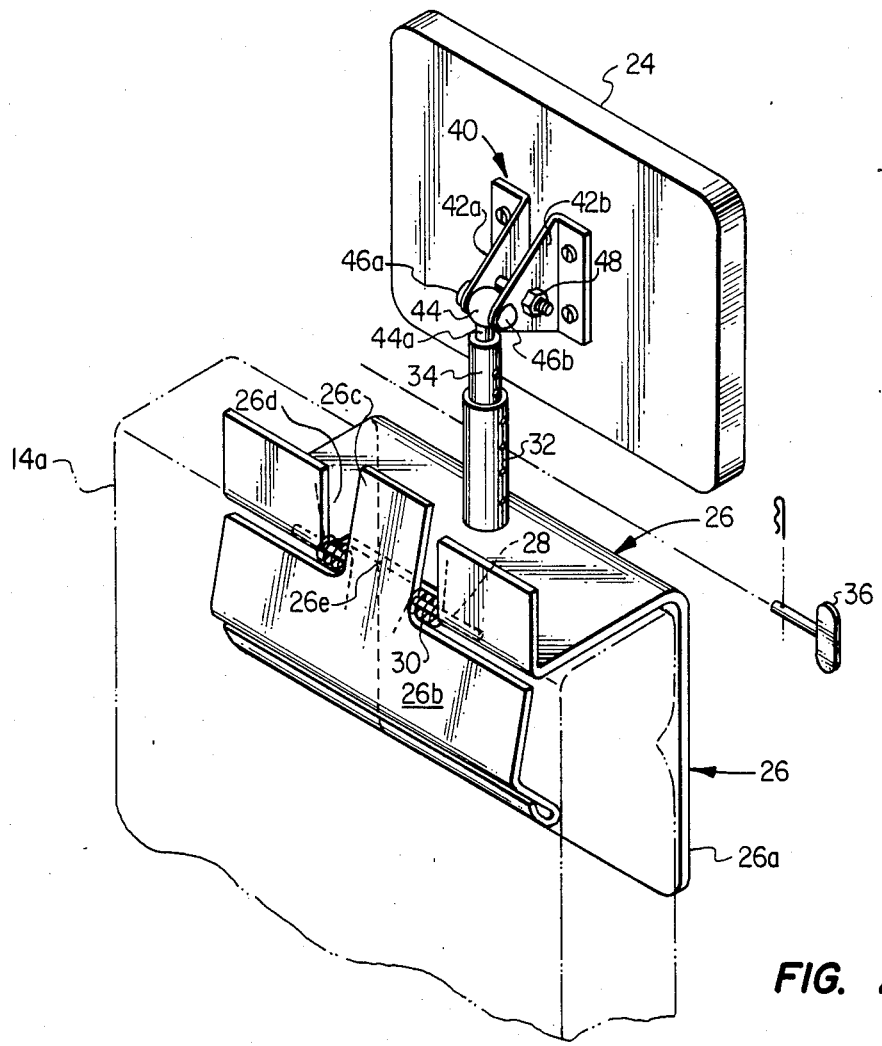
FIG. 2 is an enlarged, perspective view depicting the system of the present invention.

FIG. 2 depicts in better detail the manner in which the mirror 24 is mounted to the back support portion 14a of the rear seat 14. More particularly, a spring loaded mounting bracket 26 has one leg portion 26a extending over the front portion of the back support portion 14a, and another leg portion 26b extending over the back surface thereof. The leg portion 26b is pivotally connected to the bracket 26 by a rod 28 which extends through a tongue 26c of the leg 26b extending in a gap 26d and a notch 26e formed in the bracket 26, in a conventional manner. Two springs 30 extend between the tongue 26c and the bracket 26 with their respective ends in engagement with the surfaces of the bracket and the leg 26a as shown. In this manner, the leg portion 26b is spring loaded relative to the leg portion 26a in order to secure the bracket relative to the back support portion 14a.

A vertical sleeve 32 extends upwardly from the bracket 26 and receives, in telescoping fashion, a shaft 34. A plurality of openings are formed in the sleeve 32 and in the shaft 34, which, when aligned, receive a key 36 to secure the shaft 34 to the sleeve 32 in one of several positions depending on the desired height of the shaft and the particular openings that are aligned.

A bracket 40 is mounted to the rear of the mirror 24 and includes two ears 42a and 42b between which is inserted a ball joint 44 having a neck portion 44a rotatably mounted in the upper end portion of the shaft 34. A pair of dimples 46a and 46b are provided in the ears 42a and 42b, respectively, within which the ball joint 44 extends, to permit angular movement of the mirror 24 about a horizontal axis. A nut/bolt assembly, shown in general by the reference numeral 48, extends through the two ears 42a and 42b to enable the ears to be tightened relative to the ball joint to vary the amount of resistance to this angular movement.

Since the neck portion 44a of the ball joint assembly 44 is rotatable relative to the shaft 34, the mirror 24 is also rotatable about a vertical axis.

In operation, the infant seat 22 is placed in the back seat in the approximate position shown in FIG. 1, and the rear view mirror 16 is adjusted in a normal fashion to line it up approximately with the mirror 24. The mirror 24 is then adjusted to reflect the image from the infant to the rear view mirror for direct viewing by the driver of the vehicle.

It is thus seen that several advantages result from the foregoing. For example, the system of the present invention enables the driver of the vehicle to maintain eye contact with the road while he utilizes his standard vehicle rear view mirror to view the infant in the back seat.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. A system for viewing an infant in the rear seat of a vehicle utilizing the rear view mirror of the vehicle, said system comprising reflecting means, and means mounting, said reflecting means on the back support portion of said rear seat, said mounting means including means for adjusting the portion of said reflecting means so that it reflects the image of said infant to said rear view mirror for viewing by the driver of said vehicle.

2. The system of claim 1 wherein said mounting means comprises a spring-loaded bracket for extending over the upper edge of said back support portion of said rear seat, and means for mounting said reflecting means to said bracket.

3. The system of claim 2 wherein said adjusting means includes means connecting said reflecting means to said bracket.

4. The system of claim 2 wherein said adjusting means includes means for varying the length of said reflecting means relative to said bracket.

5. The system of claim 2 wherein said adjusting means includes means to vary the angular position of said reflecting means about a horizontal axis.

6. The system of claim 5 wherein said adjusting means includes means to vary the angular portion of said reflecting means about a vertical axis.

7. The system of claim 1 wherein said reflecting means is a mirror.

* * * * *